US011516304B2

(12) United States Patent
Sutherland (10) Patent No.: US 11,516,304 B2
(45) Date of Patent: Nov. 29, 2022

(54) THIRD-PARTY INTEGRATION OF EMERGENCY ALERT SYSTEMS

(71) Applicant: In-telligent Properties LLC, Chicago, IL (US)

(72) Inventor: Allan C. Sutherland, Orland Park, IL (US)

(*) Notice: Subject to any disclaimer, the term of this patent is extended or adjusted under 35 U.S.C. 154(b) by 223 days.

(21) Appl. No.: 17/023,903

(22) Filed: Sep. 17, 2020

(65) Prior Publication Data

US 2021/0084476 A1 Mar. 18, 2021

Related U.S. Application Data

(60) Provisional application No. 62/901,390, filed on Sep. 17, 2019.

(51) Int. Cl.
*G06F 21/00* (2013.01)
*H04L 29/06* (2006.01)
(Continued)

(52) U.S. Cl.
CPC .......... *H04L 67/53* (2022.05); *H04L 63/0853* (2013.01); *H04L 63/0884* (2013.01);
(Continued)

(58) Field of Classification Search
CPC . H04L 67/53; H04L 63/0853; H04L 63/0884; H04W 4/90; H04W 12/069;
(Continued)

(56) References Cited

U.S. PATENT DOCUMENTS 6,842,628 B1 1/2005 Arnold et al.
7,149,533 B2 12/2006 Laird et al.
(Continued)

FOREIGN PATENT DOCUMENTS

WO 2010009324 A2 1/2010
WO 2014072510 A2 5/2014
(Continued)

OTHER PUBLICATIONS

Apple Is Launching a Vast Project to Map the Inside of Every Large Building It Can, Edwards, Business Insider, Jun. 7, 2014, pp. 1-3.
(Continued)

*Primary Examiner* — Haresh N Patel (57) ABSTRACT

Aspects discussed herein relate to providing alerts to a community of devices located in or near a geographic are such as a building or property. The alerts override any alert-inhibiting state of the mobile device to deliver audio, visual, and/or haptic alerts in emergency situations. The communication and emergency alert system may be used to communicate with many different communities of people. Moreover, certain individuals may be members of more than one community at the same time, and the communities themselves may change over time based both on the user's preferences and on their physical locations. A variety of application programming interfaces can be provided to allow third-party applications to generate, transmit, and display alerts that override any alert-inhibiting state of a mobile device.

20 Claims, 7 Drawing Sheets

(51) Int. Cl.
*H04L 67/53* (2022.01)
*H04W 4/021* (2018.01)
*H04W 12/069* (2021.01)
*H04L 9/40* (2022.01)
*H04W 4/024* (2018.01)
*H04W 4/33* (2018.01)
*G08B 7/06* (2006.01)
*H04W 4/90* (2018.01)
*H04W 76/50* (2018.01)
*H04W 4/02* (2018.01)
*H04W 4/12* (2009.01)
*G08B 25/10* (2006.01)
*G08B 3/00* (2006.01)
*G08B 5/00* (2006.01)
*G08B 6/00* (2006.01)

(52) U.S. Cl.
CPC ......... *H04W 4/021* (2013.01); *H04W 12/069* (2021.01); *G08B 3/00* (2013.01); *G08B 5/00* (2013.01); *G08B 6/00* (2013.01); *G08B 7/06* (2013.01); *G08B 25/10* (2013.01); *H04W 4/023* (2013.01); *H04W 4/024* (2018.02); *H04W 4/12* (2013.01); *H04W 4/33* (2018.02); *H04W 4/90* (2018.02); *H04W 76/50* (2018.02)

(58) Field of Classification Search
CPC ....... H04W 4/021; H04W 4/12; H04W 4/024; H04W 4/33; H04W 76/50; H04W 4/023
USPC .......................................................... 726/6
See application file for complete search history.

(56) References Cited

U.S. PATENT DOCUMENTS

| | | | |
|---|---|---|---|
| 7,180,415 B2 | 2/2007 | Bankert et al. | |
| 7,460,020 B2 | 12/2008 | Reyes et al. | |
| 7,590,723 B2 | 9/2009 | Mager et al. | |
| 8,001,000 B2 | 8/2011 | Butterworth | |
| 8,013,734 B2 | 9/2011 | Saigh et al. | |
| 8,396,485 B2 | 3/2013 | Grainger et al. | |
| 8,624,727 B2 | 1/2014 | Saigh et al. | |
| 8,720,771 B2 * | 5/2014 | MacKinnon Keith | G06Q 30/06 235/375 |
| 8,792,906 B2 | 7/2014 | Batada et al. | |
| 8,866,673 B2 | 10/2014 | Mendelson | |
| 8,971,930 B2 | 3/2015 | Li et al. | |
| 9,049,555 B2 | 6/2015 | Wang et al. | |
| 9,288,620 B2 | 3/2016 | Menendez | |
| 9,351,114 B2 | 5/2016 | Chatterjee et al. | |
| 9,363,638 B1 | 6/2016 | Jones | |
| 9,549,287 B2 | 1/2017 | Baran et al. | |
| 9,589,435 B2 | 3/2017 | Finlow-Bates | |
| 9,591,444 B2 | 3/2017 | Qiu | |
| 9,640,002 B1 * | 5/2017 | Grasberg | G07C 9/00174 |
| 9,712,960 B2 | 7/2017 | Kumar et al. | |
| 9,788,153 B1 | 10/2017 | Newstadt et al. | |
| 9,788,159 B2 | 10/2017 | Wang et al. | |
| 9,826,354 B2 | 11/2017 | Alsina et al. | |
| 9,826,358 B2 | 11/2017 | Ryan et al. | |
| 9,875,251 B2 | 1/2018 | Jones | |
| 9,888,371 B1 | 2/2018 | Jacob | |
| 9,900,174 B2 | 2/2018 | Gamberini | |
| 10,251,023 B2 | 4/2019 | Sutherland | |
| 10,360,363 B1 * | 7/2019 | Grasberg | G06F 16/245 |
| 10,650,665 B2 | 5/2020 | Merjanian et al. | |
| 10,720,001 B1 * | 7/2020 | Grasberg | G07C 9/27 |
| 10,990,976 B1 * | 4/2021 | Easley | G06Q 20/02 |
| 11,146,680 B2 | 10/2021 | Leavitt et al. | |
| 2005/0096040 A1 | 5/2005 | Haberman et al. | |
| 2005/0197775 A1 | 9/2005 | Smith | |
| 2006/0121887 A1 | 6/2006 | Chilukoor | |
| 2006/0293048 A1 | 12/2006 | Swanson et al. | |
| 2008/0189162 A1 | 8/2008 | Ganong et al. | |
| 2010/0121567 A1 | 5/2010 | Mendelson | |
| 2010/0231379 A1 | 9/2010 | Hutzler et al. | |
| 2011/0112768 A1 | 5/2011 | Doyle | |
| 2011/0148634 A1 | 6/2011 | Putz | |
| 2012/0084372 A1 | 4/2012 | Cohen | |
| 2012/0274866 A1 | 11/2012 | Tada | |
| 2012/0327837 A1 | 12/2012 | Harrington et al. | |
| 2013/0099977 A1 | 4/2013 | Sheshadri et al. | |
| 2013/0203445 A1 | 8/2013 | Grainger et al. | |
| 2013/0247094 A1 | 9/2013 | Hardin et al. | |
| 2013/0316740 A1 | 11/2013 | Scarafia et al. | |
| 2014/0057648 A1 | 2/2014 | Lyman et al. | |
| 2014/0066090 A1 | 3/2014 | Henderson | |
| 2014/0129457 A1 * | 5/2014 | Peeler | G06Q 30/018 705/317 |
| 2014/0220883 A1 | 8/2014 | Emigh et al. | |
| 2014/0279422 A1 * | 9/2014 | Holman | G06Q 20/10 705/39 |
| 2014/0280526 A1 | 9/2014 | Filho | |
| 2014/0358666 A1 | 12/2014 | Baghaie et al. | |
| 2015/0031388 A1 | 1/2015 | Chatterjee et al. | |
| 2015/0111524 A1 | 4/2015 | South | |
| 2015/0140924 A1 | 5/2015 | Marathe et al. | |
| 2015/0148061 A1 | 5/2015 | Koukoumidis et al. | |
| 2015/0223022 A1 | 8/2015 | Kumar et al. | |
| 2015/0237470 A1 | 8/2015 | Mayor et al. | |
| 2016/0007156 A1 | 1/2016 | Chiou et al. | |
| 2016/0007198 A1 * | 1/2016 | Lacey | H04L 63/126 713/175 |
| 2016/0047663 A1 | 2/2016 | Iyer et al. | |
| 2016/0049064 A1 | 2/2016 | McNabb et al. | |
| 2016/0142872 A1 | 5/2016 | Nicholson et al. | |
| 2016/0360360 A1 | 12/2016 | Jones | |
| 2016/0379183 A1 * | 12/2016 | Holman | G06Q 20/12 705/44 |
| 2017/0099579 A1 | 4/2017 | Ryan et al. | |
| 2017/0103080 A1 | 4/2017 | Quong | |
| 2017/0103410 A1 | 4/2017 | Kerr et al. | |
| 2017/0148306 A1 | 5/2017 | Wolfson et al. | |
| 2017/0249622 A1 * | 8/2017 | Ortiz | H04L 63/0428 |
| 2017/0289754 A1 | 10/2017 | Anderson et al. | |
| 2017/0295159 A1 * | 10/2017 | Arora | G06F 21/6218 |
| 2017/0311131 A1 | 10/2017 | South et al. | |
| 2017/0318419 A1 * | 11/2017 | Sutherland | G06Q 50/163 |
| 2018/0054713 A1 | 2/2018 | South et al. | |
| 2018/0107795 A1 | 4/2018 | Kapur | G06N 20/00 |
| 2018/0357689 A1 * | 12/2018 | Cheng | H04W 4/026 |
| 2018/0364654 A1 | 12/2018 | Locke et al. | |
| 2018/0365942 A1 | 12/2018 | Molloy et al. | |
| 2019/0007548 A1 | 1/2019 | Sit et al. | |
| 2019/0166457 A1 | 5/2019 | Lipowski et al. | |
| 2019/0251830 A1 * | 8/2019 | Guerreiro | G08B 27/005 |
| 2019/0261145 A1 | 8/2019 | South et al. | |
| 2020/0084608 A1 | 3/2020 | Chung et al. | |
| 2020/0137441 A1 | 4/2020 | Lee et al. | |
| 2020/0175623 A1 * | 6/2020 | Howie | G01S 19/01 |
| 2021/0076454 A1 | 3/2021 | Palanivel et al. | |
| 2021/0158666 A1 | 5/2021 | Derickson | |
| 2021/0215789 A1 | 7/2021 | Hu et al. | |

FOREIGN PATENT DOCUMENTS

| | | |
|---|---|---|
| WO | 2014089462 A2 | 6/2014 |
| WO | 2014206627 A1 | 12/2014 |
| WO | 2015034904 A1 | 3/2015 |

OTHER PUBLICATIONS

Micro-Location for Internet of Things Equipped Smart Buildings, Zafari et al., arXiv1501.01539 v1, Jan. 7, 2015, pp. 1-16.

* cited by examiner

THIRD-PARTY INTEGRATION OF EMERGENCY ALERT SYSTEMS

CROSS-REFERENCE TO RELATED APPLICATIONS

The instant application claims priority to U.S. Provisional Patent Application No. 62/901,390, titled "Emergency Alert Systems" and filed Sep. 17, 2019, the disclosure of which is hereby incorporated by reference in its entirety.

FIELD OF USE

Aspects of the disclosure relate generally to communication systems and more specifically to important and emergency alert systems.

BACKGROUND

People use many different systems to send and receive messages with others, including individual emails, group emails, texts to mobile devices, etc. during emergency and time-sensitive events. Existing emergency alert systems like the Federal Emergency Alert System rely on people listening to a radio, television, or similar device to receive their alerts. These devices may interfere with sleep and therefore are usually turned off while people are sleeping or otherwise busy. The precision in which emergency alert systems use for transmitting alerts is further limited to existing telecommunication architecture. For example, if there were a fire in a portion of Orange County, Calif., the existing emergency alerts systems would notify the entire Los Angeles metropolitan area and portions of the surrounding counties. Alert systems utilizing mobile phones are similarly limited as they do not allow for emergency alerts to be audibly provided while the mobile phone is in a silent or do not disturb mode.

Aspects described herein may address these and other problems, and generally improve the quality, efficiency, and speed of emergency alerts by improving the ability of a system to quickly and easily identify groups of people such that these people may be quickly contacted in the event of an emergency.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects discussed herein relate to communicating with a community of people determined by a geofencing system to be physically in or near a location such as a building or property, wherein the system overrides any alert-inhibiting state in the people's mobile devices (or any other device) to deliver audio or visual alerts in emergency situations. In addition to providing emergency alerts, the present system may be used by building managers to communicate with people living or working in a building, by university administration to communicate with students or instructors on a university campus, by airport management to communicate with travelers passing through the airport, by a stadium operator to communicate with fans at a sporting game, and a variety of other uses. As may be appreciated, the present communication and emergency alert system may be used by many different groups of administrators to communicate with many different communities of people. Moreover, certain individuals may be members of more than one community at the same time, and the communities themselves may change over time based both on the user's preferences and on their physical locations. A variety of application programming interfaces can be provided to allow third-party applications to generate, transmit, and display alerts that override any alert-inhibiting state of a mobile device.

In one embodiment, a computer-implemented method includes obtaining, from a third-party device, a request to generate an emergency alert including at least one notification and a message, obtaining, from the third-party device, administrator login information, generating a security token by authenticating the administrator login information, generating a modified message including the security token, the message, the at least one notification, and embedded instructions, and transmitting the modified message to a third-party server system, wherein the modified message causes the third-party server system to transmit the modified message to at least one mobile device.

In yet another embodiment of the invention, the modified message causes a mobile device in the at least one mobile device to execute the embedded instructions to override an alert-inhibiting state of the mobile device to display the notifications.

In still another embodiment of the invention, the computer-implemented method further includes executing the embedded instructions by providing the security token to an emergency alert application executing on the mobile device, authenticating, by the emergency alert application and based on the security token, the modified message, and displaying, by the emergency alert application, the at least one notification and the message.

In yet still another additional embodiment of the invention, the computer-implemented method further includes obtaining, by a third-party application executing on the mobile device, the modified message, and executing, by the third-party application, the embedded instructions to display the at least one notification.

In yet another additional embodiment of the invention, the at least one notification is selected from the group consisting of an audible notification, a visual notification, and a haptic notification.

In still another additional embodiment of the invention, the security token includes a security certificate.

In yet still another additional embodiment of the invention, the computer-implemented method further includes obtaining at least one user characteristic, determining, based on the at least one user characteristic, at least one related user, determining, based on the at least one related user, at least one related mobile device, and transmitting the modified message to the at least one related mobile device.

Yet another embodiment of the invention includes a computing device including a processor and a memory in communication with the processor and storing instructions that, when read by the processor, cause the computing device to obtain, from a third-party device, a request to generate an emergency alert including at least one notification and a message, obtain, from the third-party device, administrator login information, generate a security token by authenticating the administrator login information, generate a modified message including the security token, the message, the at least one notification, and embedded instructions, and transmit the modified message to a third-party server system, wherein the modified message causes the third-party server system to transmit the modified message to at least one mobile device.

In yet another embodiment of the invention, the modified message causes a mobile device in the at least one mobile device to execute the embedded instructions to override an alert-inhibiting state of the mobile device to display the notifications.

In still another embodiment of the invention, the instructions, when read by the processor, further cause the computing device to cause the mobile device to execute the embedded instructions by providing the security token to an emergency alert application executing on the mobile device, authenticating, by the emergency alert application and based on the security token, the modified message, and displaying, by the emergency alert application, the at least one notification and the message.

In yet still another embodiment of the invention, the instructions, when read by the processor, further cause the computing device to cause the mobile device to obtain, by a third-party application executing on the mobile device, the modified message and execute, by the third-party application, the embedded instructions to display the at least one notification.

In yet another additional embodiment of the invention, the at least one notification is selected from the group consisting of an audible notification, a visual notification, and a haptic notification.

In still another additional embodiment of the invention, the security token includes a security certificate.

In yet still another additional embodiment of the invention, the instructions, when read by the processor, further cause the computing device to obtain at least one user characteristic, determine, based on the at least one user characteristic, at least one related user, determine, based on the at least one related user, at least one related mobile device, and transmit the modified message to the at least one related mobile device.

Still another embodiment of the invention includes a non-transitory machine-readable medium storing instructions that, when executed by one or more processors, cause the one or more processors to perform steps including obtaining, from a third-party device, a request to generate an emergency alert including at least one notification and a message, obtaining, from the third-party device, administrator login information, generating a security token by authenticating the administrator login information, generating a modified message including the security token, the message, the at least one notification, and embedded instructions, and transmitting the modified message to a third-party server system, wherein the modified message causes the third-party server system to transmit the modified message to at least one mobile device.

In yet another embodiment of the invention, the modified message causes a mobile device in the at least one mobile device to execute the embedded instructions to override an alert-inhibiting state of the mobile device to display the notifications.

In still another embodiment of the invention, the instructions, when executed by one or more processors, further cause the one or more processors to perform steps including causing the mobile device to execute the embedded instructions by providing the security token to an emergency alert application executing on the mobile device, authenticating, by the emergency alert application and based on the security token, the modified message, and displaying, by the emergency alert application, the at least one notification and the message.

In yet still another embodiment of the invention, the instructions, when executed by one or more processors, further cause the one or more processors to perform steps including causing the mobile device to execute the embedded instructions by obtaining, by a third-party application executing on the mobile device, the modified message and executing, by the third-party application, the embedded instructions to display the at least one notification.

In yet another additional embodiment of the invention, the at least one notification is selected from the group consisting of an audible notification, a visual notification, and a haptic notification.

In still another additional embodiment of the invention, the instructions, when executed by one or more processors, further cause the one or more processors to perform steps including obtaining at least one user characteristic, determining, based on the at least one user characteristic, at least one related user, determining, based on the at least one related user, at least one related mobile device, and transmitting the modified message to the at least one related mobile device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Emergency alert systems may override any alert-inhibiting state in a person's mobile device to deliver an audio or visual alert in an emergency. Emergency alert systems provide a method of communicating with members of a community by using geofencing to determine the location of users such that they may optionally be automatically added to a community. Members may be auto-subscribed into the community based on their physical locations. These subscriptions may change from time to time as the mobile device moves. Users may also be added to a community based on their own user preferences. People may be members of more than one community and the communities may change over time. A variety of systems and methods for establishing the location of a mobile device and providing alerts to the mobile device in accordance with embodiments of the invention are described in U.S. Pat. No. 10,251,023, titled "Notification and Communication System using Geofencing to Identify Members of a Community" and issued Apr. 2, 2019, the disclosure of which is hereby incorporated by reference in its entirety.

For example, emergency alert systems in accordance with embodiments of the invention can communicate with members of a community by using geofencing to determine the location of users such that they can optionally be automatically added to a community. As such, members may be auto-subscribed into the community based on their physical locations (which may change from time to time). Members or users can also be added to the community based on their own user preferences. People can be members of more than one community and the communities can change over time. Geofencing systems can be used to determine whether a particular mobile device is physically present in a geographic region or area or range (for example, in a building or on a property) based upon the physical location of the smartphone. If the user's phone is determined to be on the property, the user's phone can be automatically added to the property community. In cases where the mobile device is determined not to be physically present on the property (e.g. not detected by proximity sensors in the location), the user can be provided with the option of voluntarily subscribing to join the community. In this way, interested users (e.g.: building tenants who are away at work, or persons working at different jobsites) can be kept informed of developments and alerts with regard to a particular property community even when they are physically away from that property.

Emergency alert systems determine the "alert state" of each of the individuals' smart devices. This can be accomplished by sending a signal to the user's mobile device to determine if the "silent" or "do not disturb" setting is on. If the mobile device setting is alert-enabled (e.g. the "do not disturb" or "silent" function is not turned on), then the mobile device is ready to receive alert messages at step 210. However, in those cases where the mobile device is not alert-enabled (e.g. the "do not disturb" or "silent" function is turned on), then one of two options is possible. First, the user can be sent a message asking if the alert setting can be switched to alert-enabled. Should the user agree and grant permission, then the alert enabled setting is enabled (e.g. the "do not disturb" or "silent" function is overridden). Alternatively, the present system may instead automatically override the "do not disturb" or "silent" function, thereby enabling the mobile device to receive alerts and communications from the emergency alert system irrespective of the "do not disturb" or "silent" function. As such, an important advantage of the present system is that it can be prioritized over typical email, text, and notification traffic, even when the user's phone is set on silent, and warn building or property occupants in the event of an emergency situation such as a fire, crime, or medical emergency.

In addition to sending safety alerts, emergency alert systems can send property-specific (and/or interest group-specific) messages and non-property-specific messages (e.g. messages appealing to more than one property or interest group-specific group). The property-specific messages and the non-property-specific messages may be sent with the smartphone's "do not disturb" or "silent" function overridden and turned off. However, the more likely desired setting may be having the property-specific messages and non-property-specific messages subject to the smartphone's "do not disturb" or "silent" settings. Emergency alert systems can be configured such that only safety alert messages will override the smartphone's "do not disturb" or "silent" settings while other messages (e.g.: building advertisements/messages) will not override the smartphone's "do not disturb" or "silent" settings. The settings used can optionally be set by members of the community themselves, either by the manager or administrator of the community, or both. This is desirable such that users/community members receive safety alerts such as "fire" or "active shooter in the building" without such messages being silenced, but are able to block, silence, or turn off messages like "lunch specials in the building's cafe." In preferred aspects, such advertising may be targeted and, for example, by being tailored to businesses within a 2 to 3 block radius around building. Moreover, when the user/community member first registers with the present system, they can be asked a series of questions to better target the advertising to their desires in addition to their location.

Figure 1:
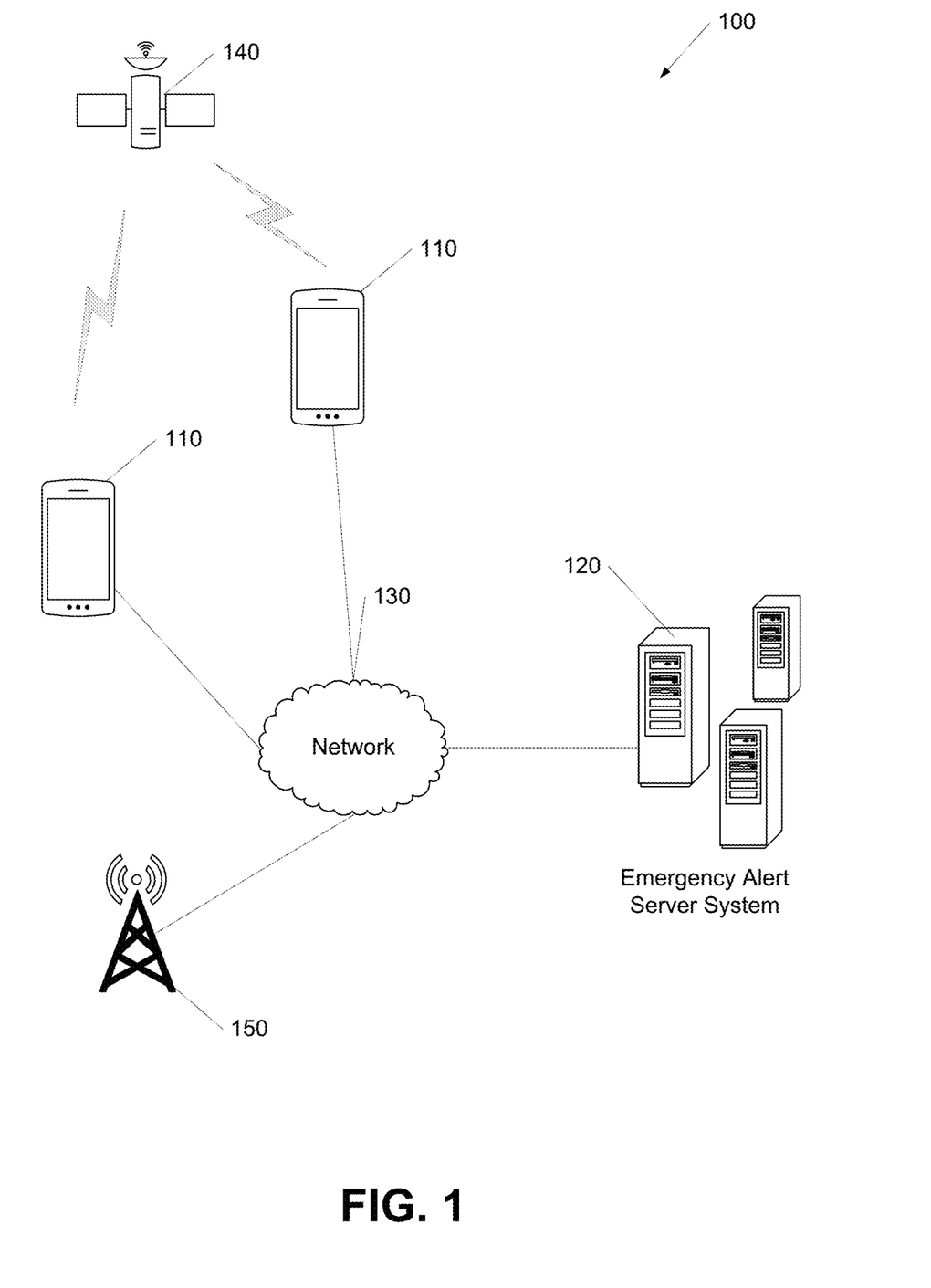
FIG. 1 illustrates an example of an emergency alert system in which one or more aspects described herein may be implemented.

FIG. 1 illustrates an emergency alert system 100 in accordance with an embodiment of the invention. The emergency alert system 100 includes at least one client device 110 and/or at least one emergency alert server system 120 in communication via a network 130. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Client devices 110 may provide data to and/or obtain data from the at least one emergency alert server system 120 as described herein. The client devices may determine their geographic location using a variety of location-determination techniques, including receiving positioning signals from positioning system satellites 140, cellular tower triangulation, WiFi positioning systems, geocoding systems, and the like. Emergency alert server systems 120 may store and process a variety of data as described herein. The network 130 may include a local area network (LAN), a wide area network (WAN), a wireless telecommunications network, and/or any other communication network or combination thereof.

The emergency alert system may also include a variety of virtual border transmitters 150. Virtual border transmitters may broadcast a signal that is capable of determining when an object, such as a person, mobile device, vehicle, and the like, enters or crosses a particular geographic location. The virtual border transmitter may be able to determine its own location via a variety of technologies, such as via GPS, and/or be pre-programmed to know its location. In this way, the virtual border transmitter may be used to create a virtual fence around a particular geographic area. In several embodiments, a number of virtual border transmitters are installed in a specific geographic region to create a virtual border around a particular geographic region. In many embodiments, a virtual border transmitter is installed in a vehicle (or other moving object) that may detect movement in an area surrounding the vehicle. In this way, specific geofenced areas may be created, either in fixed locations or in moving locations.

Some or all of the data described herein may be stored using any of a variety of data storage mechanisms, such as databases. These databases may include, but are not limited to relational databases, hierarchical databases, distributed databases, in-memory databases, flat file databases, XML databases, NoSQL databases, graph databases, and/or a combination thereof. The data transferred to and from various computing devices in the emergency alert system 100 may include secure and sensitive data, such as confidential documents, customer personally identifiable information, and account data. It may be desirable to protect transmissions of such data using secure network protocols and encryption and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the emergency alert system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the emergency alert system 100 in front of one or more computing devices such that any external devices may communicate directly with the specialized hardware.

Figure 2:
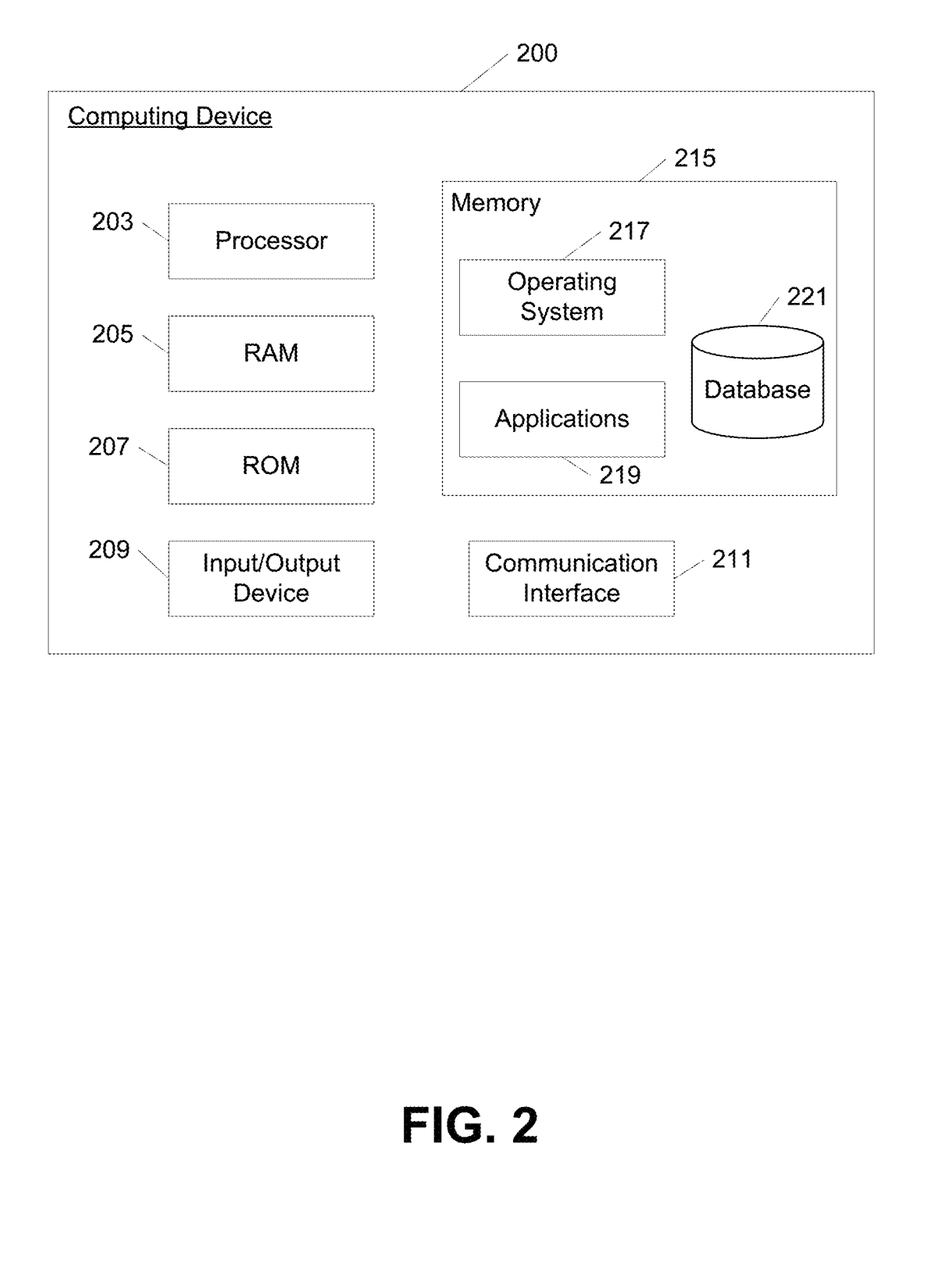
FIG. 2 illustrates an example computing device in accordance with one or more aspects described herein.

Turning now to FIG. 2, a computing device 200 in accordance with an embodiment of the invention is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Communication interface 211 may include one or more transceivers, digital signal processors, and/or additional circuitry and software for communicating via any network, wired or wireless, using any protocol as described herein. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Emergency alert system can override any alert-inhibiting state in a person's mobile device to deliver an audio or visual alert in an emergency situation. Members of a community can be determined by using geofencing to determine the location of users such that they can optionally be automatically added to a community. As such, members may be auto-subscribed into the community based on their physical locations, which may change from time to time. Members or users can also be added to the community based on their own user preferences. People can be members of more than one community and the communities can change over time.

Figure 3:
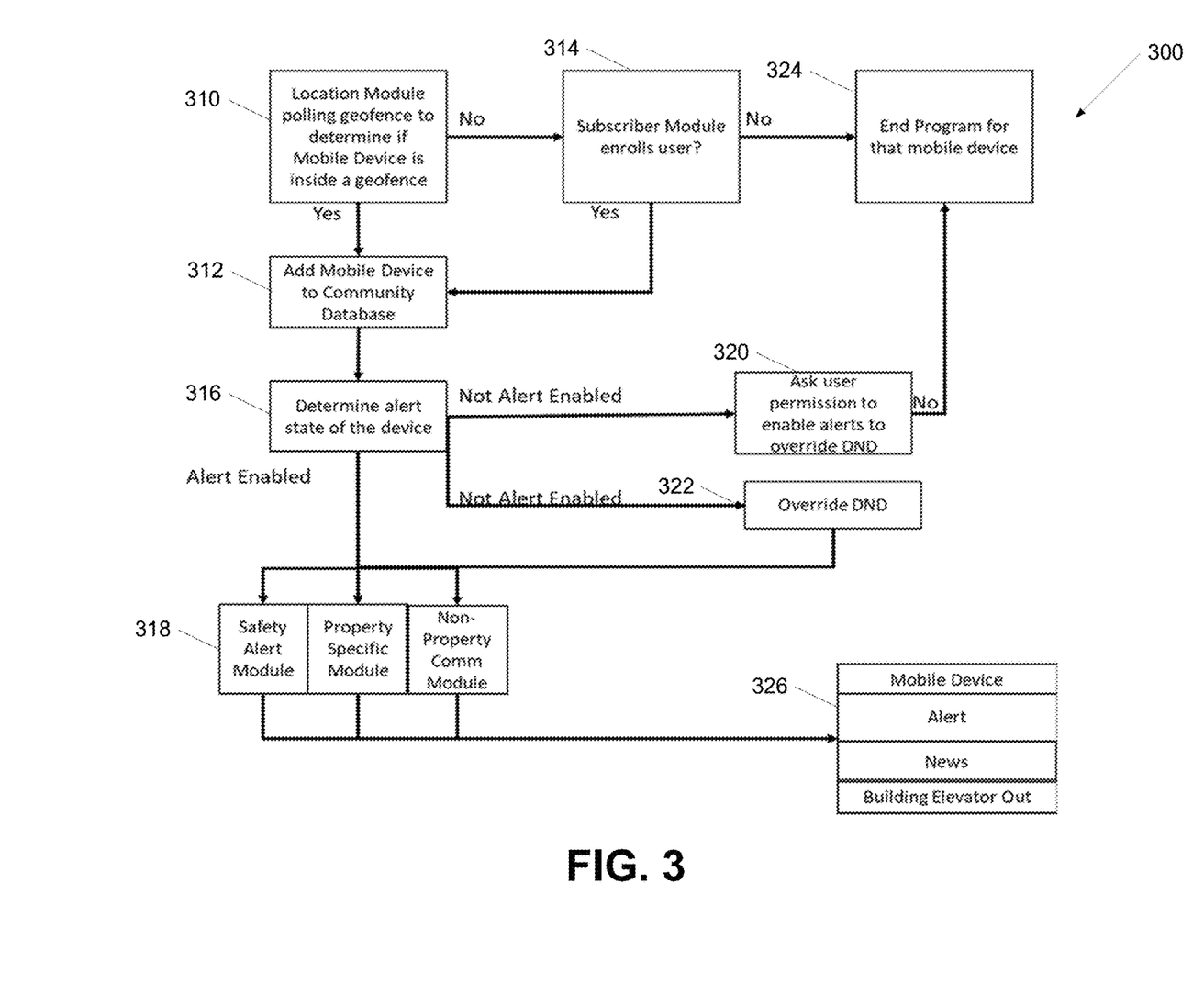
FIG. 3 illustrates a process for providing an emergency alert in accordance with one or more aspects described herein.

FIG. 3 illustrates a process for providing an emergency alerts to members of a community in accordance with one or more aspects described herein. Some or all of the steps of process 300 may be performed using any of the computing devices and/or combination thereof described herein. In a variety of embodiments, some or all of the steps described below may be combined and/or divided into sub-steps as appropriate.

At step 310, it can be determined if a mobile device is located within a particular region. For example, an emergency alert server system, using a geofencing and/or GPS systems, can determine whether a mobile device associated with a particular user is physically present in a geographic region or area or range (e.g. In a building or on a property) based upon the physical location of the mobile device. In several embodiments, the physical location of the mobile device can be determined based on a GPS location augmented using one or more beacons located in the geographic region. At step 312, if the user's mobile device is determined to be on the property, the user's mobile device can be automatically added to a community database. In several embodiments, the mobile device can be added to the community database by the emergency alert server system. At step 314, in cases where the user's mobile device is determined not to be physically present on the property (e.g. not detected by proximity sensors), the user can be provided with the option of voluntarily subscribing to join the community (e.g. enter the user's mobile device into the community database) by providing a subscription request on the mobile device. In this way, interested users (e.g. building tenants who are away at work, persons working at different job sites, and the like) can be kept informed of developments and alerts with regard to a particular property community even when they are physically away from that property. If the mobile device does not subscribe to the community, the process can end at step 324.

At step 316, the alert state of each of the subscribed user's mobile devices can be determined. This can be accomplished by sending a signal to the mobile device to determine if the mobile device's "silent" or "do not disturb" setting is on. If the mobile device setting is alert-enabled (e.g. the "do not disturb" or "silent" function is not turned on), then the mobile device is ready to receive alert messages. However, in those cases where the mobile device is not alert-enabled (e.g. the "do not disturb" or "silent" function is turned on), then one of two options is possible. First, at step 320, a message can be sent to the user asking if the alert setting can be switched to alert-enabled. Should the user agree and grant permission, then the alert enabled setting is enabled (e.g. the "do not disturb" or "silent" function is overridden). If the user does not agree to set the mobile device to an alert-enabled state, the process can end at step 324. Second, at step 322, the system may instead proceed directly to automatically override the "do not disturb" or "silent" function, thereby enabling the mobile device to receive alerts and communications from system.

At step 318, a variety of messages can be sent using the emergency alert server system. In addition to sending safety alerts through the safety alert module, the emergency alert server system also can send property-specific (or interest group-specific) messages using the property specific module and non-property-specific messages (e.g. Messages appealing to more than one property or interest group-specific group) using the non-property communication module. In different optional embodiments of the system, the property-specific messages sent by the property specific module and the non-property-specific messages sent by the non-property communication module may be sent with the "do not disturb" or "silent" function (e.g. an alert-inhibiting setting) of the mobile device overridden and turned off. However, the more likely desired setting may be to have the property-specific messages sent by the property specific module and non-property-specific messages sent by the non-property communication module are subject to the "do not disturb" or "silent" settings of the mobile device. In such a case, the emergency alert system can be configured such that only safety alert messages will override the "do not disturb" or "silent" settings of the mobile device, while other messages (e.g. Building advertisements and/or messages) will not override the "do not disturb" or "silent" settings. The settings used can optionally be set by members of the community themselves, by the manager or administrator of the community, or both. This is desirable such that users/community members receive safety alerts such as "fire" or "active shooter in the building" without such messages being silenced, but can block, silence, or turn off messages like "lunch specials in the building's café." These various alerts can be provided via the mobile device in step 326. The alerts may be provided using any audible, visual, and/or haptic notifications indicated in the alert.

Emergency alert systems can provide one or more application programming interfaces (API) that provide functions to third-party services. A third-party service can invoke the API using one or more remote service calls, such as a web service, to provide data to the emergency alert system. The provided data can include one or more notifications, alert data, and/or information identifying one or more mobile devices as described herein. The function can generate an alert using the emergency alert system and provide the alert to the indicated mobile devices. The alert can cause the mobile device to display one or more notifications indicated in the alert by override any alert-inhibiting state of the mobile device. A mobile application executing on the mobile device can direct messages and data to the user interface of the mobile device within the application. Third-party databases can store user or subscriber data for a third-party application or application. This may include the user or subscriber's name, type of device, variables, groups, and any other data associated with the third-party application. A variety of messages may be sent to mobile devices using a mobile application associated with a third-party service such as updates, notifications, general news, and the like. The emergency alert server system can obtain messages to specific groups or users in a third-party application based on their selection of variables that differentiate and group users within the community into groups or individuals.

An emergency alert server system may generate a third-party alert when a user, such as an administrator of a third-party application, sends an emergency or urgent message or alert to the subscribers of the third-party application. The emergency alert server system generates alerts that allow the administrators of the third-party application to override the normal messaging within the application to allow the administrator to force the alert by overriding any alert-inhibiting state on the mobile devices subscribed to the third-party application and the third-party database. In a variety of embodiments, an emergency alert application is installed on the mobile device that is capable of overriding the alert-inhibiting state of a mobile device to display a variety of notifications on the mobile device. The emergency alert application can obtain alerts from an emergency alert server system for display on the mobile device as described herein. In several embodiments, the emergency alert application can include an API that allows other mobile applications installed on the mobile device to display alerts that override the alert-inhibiting state of the mobile device. In many embodiments, the API requires that the mobile devices provide administrator login information (and/or any other sort of security token) that indicates that the alert being provided to the emergency alert application has been authorized for display by an emergency alert server system. In this way, the emergency alert application can use the security token to limit the display of notifications that override the alert-inhibiting state of the mobile device.

The emergency alert server system can obtain, depending upon the alert condition, a user response to the delivered alert. The user response can include an indication that the user viewed the alert. In many embodiments, the user having viewed the alert can be indicated by the user having interacted with their mobile device after the alert was delivered to and/or displayed by an emergency alert application executing on the mobile device, where the emergency alert application can display one or more notifications indicated in the alert by overriding any alert-inhibiting state of the mobile device as described herein. The user response can include any responses to prompts and/or questions provided in the alert, such as a request for additional information about an alert condition, the user's response to the alert condition, and the like.

Figure 4:
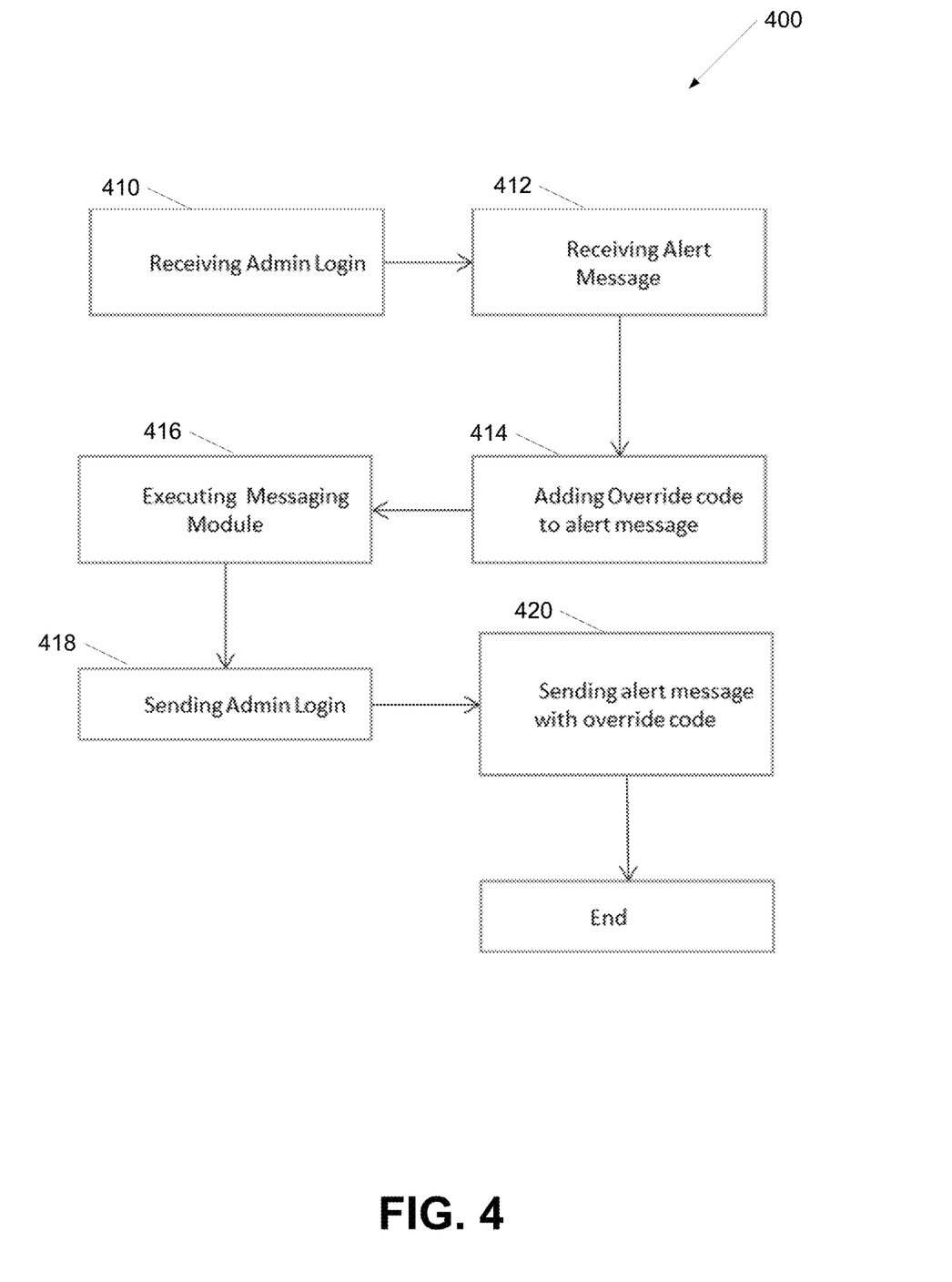
FIG. 4 depicts a flow chart for third-party messaging using emergency alert systems according to one or more aspects of the disclosure.

FIG. 4 depicts a flow chart for third-party messaging using emergency alert systems according to one or more aspects of the disclosure. Some or all of the steps of process 400 may be performed using any of the computing devices and/or combination thereof described herein. In a variety of embodiments, some or all of the steps described below may be combined and/or divided into sub-steps as appropriate.

At step 410, an emergency alert server system can receive an administrator's login information for a third-party messaging system or application. The administrator's login information can be received through a user interface provided by the emergency alert server system. For example, if an administrator needed to send out an alert message through the third-party application, the administrator would log into the emergency alert server system. The message or alert that the administrator wants to send can be received. At step 412, the emergency alert server system can obtain a message to be sent as well as a list of recipients, a group, or some sort of variable that would identify a user, group of users, and/or set of mobile devices associated with the third-party application. At step 414, the emergency alert server system can modify the obtained message to generate an alert having one or more notifications. In several embodiments, the obtained message is modified by embedded instructions in the message such that the message is only able to be used once for overriding an alert-inhibiting state of a mobile device. The instructions can be embedded with the message so that is may easily be delivered to the mobile device via the third-party application. In many embodiments, the message is modified to include the administrator login information and/or a security token generated based on the administrator login information.

At step 416, the modified message can be transmitted to the indicated mobile devices via the third-party application. The modified message can be transmitted by the emergency alert server system and/or a third-party server system associated with the third-party application as appropriate. At step 418, the administration credentials can be used to authorize the transmission of the modified message via either the emergency alert server system and/or third-party server system. This can be important to allow the embedded code to be transmitted to the third-party applications. At step 420, the modified message can be transmitted to the mobile devices indicated in the message.

Figure 5:
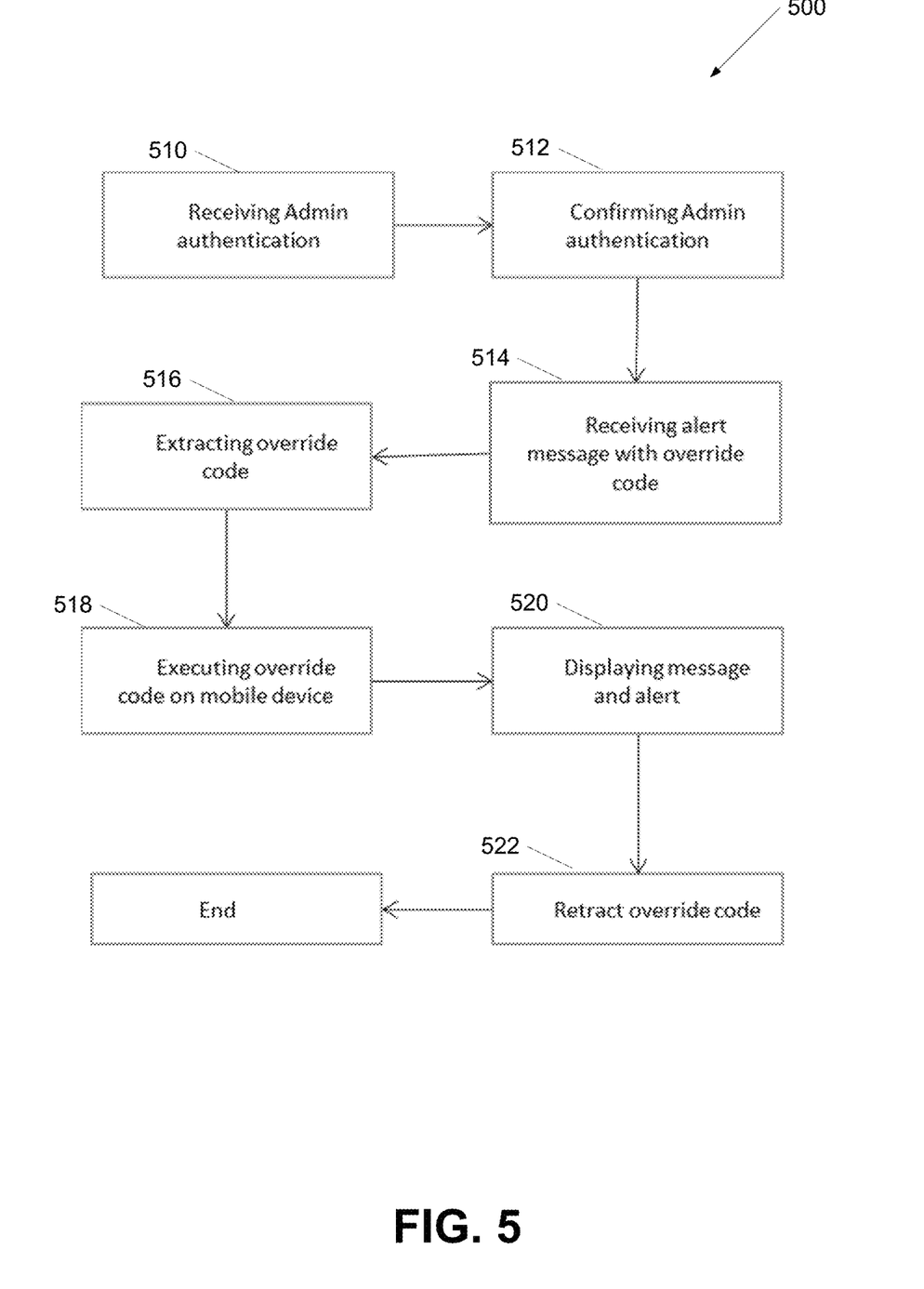
FIG. 5 depicts a flow chart for providing alerts using third-party applications according to one or more aspects of the disclosure.

FIG. 5 depicts a flow chart for providing alerts using third-party applications according to one or more aspects of the disclosure. Some or all of the steps of process 500 may be performed using any of the computing devices and/or combination thereof described herein. In a variety of embodiments, some or all of the steps described below may be combined and/or divided into sub-steps as appropriate.

At step 510, a mobile device can receive an administrator authentication and/or security token as appropriate. The administrator authentication can be transmitted by a third-party server system and/or emergency alert server system as described herein. At step 512, the mobile device can validate the authentication. At step 514, the mobile device can obtain an alert. The alert can include one or more notifications, an alert message and/or embedded instructions as described herein. At step 516, the mobile device can extract the instructions embedded in the alert. At step 518, the mobile device can execute the embedded instructions. In many embodiments, the mobile device executes the embedded instructions by using the administrator authentication administration login information to override one or more code-execution prohibitions on the mobile device. In several embodiments, an emergency alert application executing on the mobile device, once authenticated using the administrator login information and/or security token, overrides the alert-inhibiting state of the mobile device to allow for the display of the notifications indicated in the alert. At step 520, the mobile device can display the one or more notifications indicated in the alert. In several embodiments, the instructions cause the notifications to be displayed irrespective of any alert-inhibiting settings on the mobile device. For example, an emergency alert application may be installed on the mobile device and the instructions cause the emergency alert application to display the notifications. The emergency alert application can include instructions to cause the notifications to be displayed on the mobile device regardless of the alert-inhibiting settings of the mobile device as described herein. The notifications can include, but are not limited to, audio notifications, visual notifications, haptic notifications, and the like. At step 522, the embedded instructions, administrator login information, and/or security token can be flagged and/or deleted from the received message. This can be used to prevent the emergency alert application from displaying the notifications multiple times.

Figure 6:
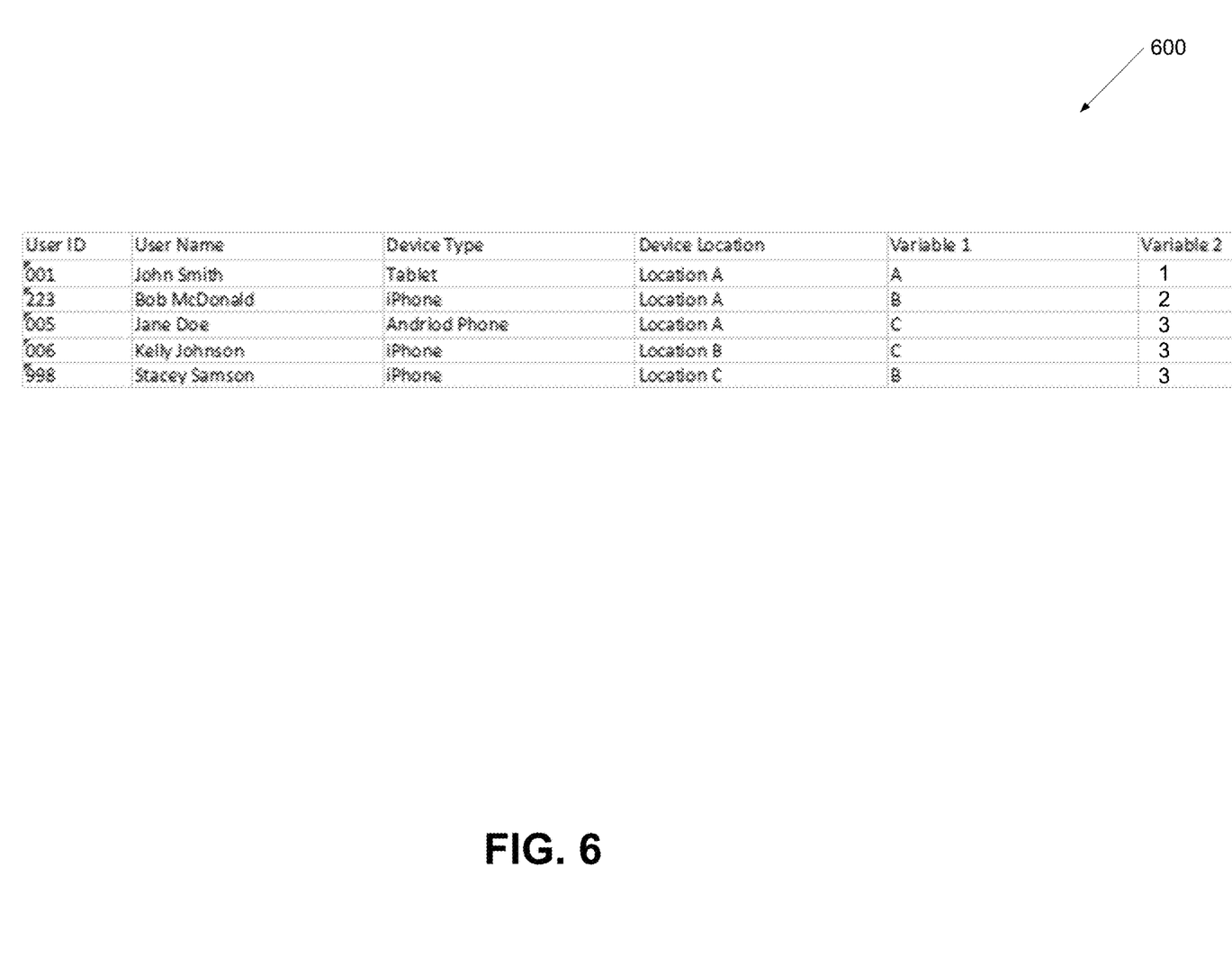
FIG. 6 depicts a third-party database according to one or more aspects of the disclosure.

FIG. 6 depicts a third-party database according to one or more aspects of the disclosure. The database 600 can store third-party user data for all users that are subscribed or uses a third-party application. The third-party database can include usernames, mobile device information, location data, and/or any other attributes related to the users or subscribers, including any data that may be used to identify a user or subscriber or groups, that is utilized by the third-party application. For example, if the third-party application allows users or subscribers to monitor and trade stocks, the database may contain which stocks the users invest. Additionally, the database can store grouping information to group users by one or more attributes, such as by portfolio or investments.

Figure 7:
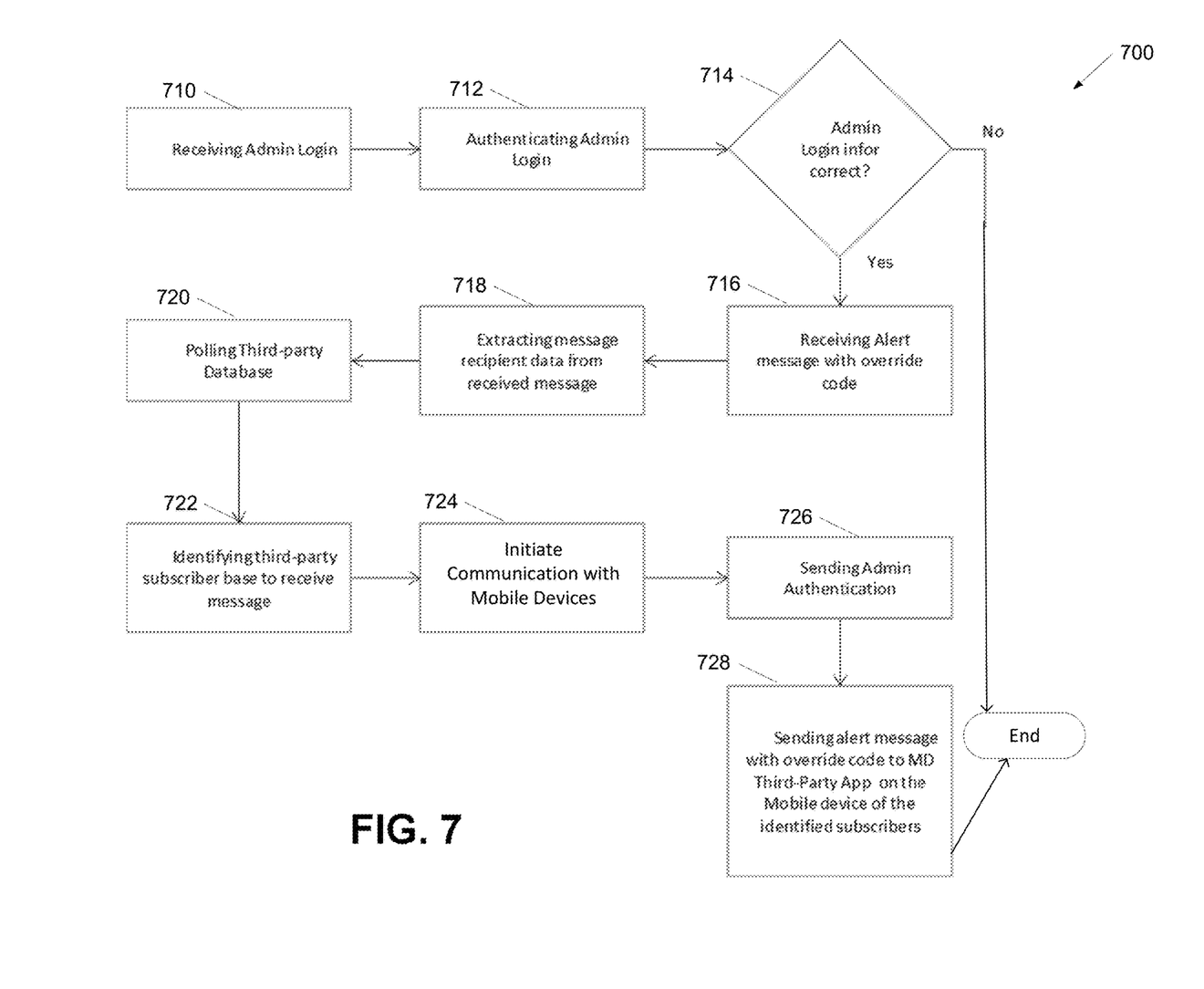
FIG. 7 depicts a flow chart for sending alerts using a third-party server system according to one or more aspects of the disclosure.

FIG. 7 depicts a flow chart for sending alerts using a third-party server system according to one or more aspects of the disclosure. Some or all of the steps of process 700 may be performed using any of the computing devices and/or combination thereof described herein. In a variety of embodiments, some or all of the steps described below may be combined and/or divided into sub-steps as appropriate.

At step 710, a third-party server system can obtain administrator login information and/or a security token as described herein. At step 712, the third-party server system can authenticate the administrator login information and/or security token. For example, the third-party server system can generate a signature based on the administrator login information. The signature can be generated using any of a variety of techniques, such as generating a hash of the administrator login information, as appropriate. The third-party server system can compare the generated signature to a known signature for the administrator to determine if the administrator login information is valid. When the comparison indicates that the administrator login information is correct the third-party server system can authenticate the administrator login information. In a second example, a security token can be authenticated using a public/private key pair and/or security certificate. At step 714, if the third-party server system does not authenticate the administrator login information, the process can end. The third-party server system can provide multiple attempts to obtain valid administrator login information if desired.

When the third-party server system authenticates the administrator login information and/or security token at step 714, the emergency alert server system can obtain an alert at step 716. The alert can include embedded instructions to cause a mobile device to display notifications overriding an alert-inhibiting state of the mobile device as described herein. In several embodiments, the mobile device displays the notifications by providing the alert and the administrator login information and/or security token to an emergency alert application executing on the mobile device. At step 718, the third-party server system can extract one or more recipients from the message. The recipient data can include any identifying information for a user, group of users, and/or set of mobile devices. In several embodiments, the third-party server system uses user information and/or group information to identify one or more mobile devices associated with the users and/or groups. For example, at step 720, the third-party server system can query a third-party database to determine one or more mobile devices associated with the indicated users and/or groups of users. At step 722, related users and/or can be identified. The related users or groups can be determined based on a characteristic of the identified users and/or groups. For example, if the indicated users are part of a group that buys and sells stocks, related users may be other users that are not indicated in the message but are invested in one or more stocks in common with the identified users. At step 724, the third-party server system can initiate communication with the identified mobile devices. At step 726, the third-party server system can transmit the administrator login information to the mobile devices. At step 728, the third-party server system can transmit the alert to the mobile devices. The mobile devices can use the administrator login information and/or embedded instructions to display the notifications indicated in the alert as described herein.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied, in whole or in part, in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, comprising:
   obtaining, from a third-party device, a request to generate an emergency alert comprising at least one notification and a message;
   obtaining, from the third-party device, administrator login information;
   generating a security token by authenticating the administrator login information;
   generating a modified message comprising the security token, the message, the at least one notification, and embedded instructions; and transmitting the modified message to a third-party server system, wherein the modified message causes the third-party server system to transmit the modified message to at least one mobile device.

2. The computer-implemented method of claim 1, wherein the modified message causes a mobile device in the at least one mobile device to execute the embedded instructions to override an alert-inhibiting state of the mobile device to display the notifications.

3. The computer-implemented method of claim 2, further comprising executing the embedded instructions by:
providing the security token to an emergency alert application executing on the mobile device;
authenticating, by the emergency alert application and based on the security token, the modified message; and
displaying, by the emergency alert application, the at least one notification and the message.

4. The computer-implemented method of claim 2, further comprising:
obtaining, by a third-party application executing on the mobile device, the modified message; and
executing, by the third-party application, the embedded instructions to display the at least one notification.

5. The computer-implemented method of claim 1, wherein the at least one notification is selected from the group consisting of an audible notification, a visual notification, and a haptic notification.

6. The computer-implemented method of claim 1, wherein the security token comprises a security certificate.

7. The computer-implemented method of claim 1, further comprising:
obtaining at least one user characteristic;
determining, based on the at least one user characteristic, at least one related user;
determining, based on the at least one related user, at least one related mobile device; and
transmitting the modified message to the at least one related mobile device.

8. A computing device, comprising:
a processor; and
a memory in communication with the processor and storing instructions that, when read by the processor, cause the computing device to:
obtain, from a third-party device, a request to generate an emergency alert comprising at least one notification and a message;
obtain, from the third-party device, administrator login information;
generate a security token by authenticating the administrator login information;
generate a modified message comprising the security token, the message, the at least one notification, and embedded instructions; and
transmit the modified message to a third-party server system, wherein the modified message causes the third-party server system to transmit the modified message to at least one mobile device.

9. The computing device of claim 8, wherein the modified message causes a mobile device in the at least one mobile device to execute the embedded instructions to override an alert-inhibiting state of the mobile device to display the notifications.

10. The computing device of claim 9, wherein the instructions, when read by the processor, further cause the computing device to cause the mobile device to execute the embedded instructions by:
providing the security token to an emergency alert application executing on the mobile device;
authenticating, by the emergency alert application and based on the security token, the modified message; and
displaying, by the emergency alert application, the at least one notification and the message.

11. The computing device of claim 9, wherein the instructions, when read by the processor, further cause the computing device to cause the mobile device to:
obtain, by a third-party application executing on the mobile device, the modified message; and
execute, by the third-party application, the embedded instructions to display the at least one notification.

12. The computing device of claim 8, wherein the at least one notification is selected from the group consisting of an audible notification, a visual notification, and a haptic notification.

13. The computing device of claim 8, wherein the security token comprises a security certificate.

14. The computing device of claim 8, wherein the instructions, when read by the processor, further cause the computing device to:
obtain at least one user characteristic;
determine, based on the at least one user characteristic, at least one related user;
determine, based on the at least one related user, at least one related mobile device; and
transmit the modified message to the at least one related mobile device.

15. A non-transitory machine-readable medium storing instructions that, when executed by one or more processors, cause the one or more processors to perform steps comprising:
obtaining, from a third-party device, a request to generate an emergency alert comprising at least one notification and a message;
obtaining, from the third-party device, administrator login information;
generating a security token by authenticating the administrator login information;
generating a modified message comprising the security token, the message, the at least one notification, and embedded instructions; and
transmitting the modified message to a third-party server system, wherein the modified message causes the third-party server system to transmit the modified message to at least one mobile device.

16. The non-transitory machine-readable medium of claim 15, wherein the modified message causes a mobile device in the at least one mobile device to execute the embedded instructions to override an alert-inhibiting state of the mobile device to display the notifications.

17. The non-transitory machine-readable medium of claim 16, wherein the instructions, when executed by one or more processors, further cause the one or more processors to perform steps comprising:
causing the mobile device to execute the embedded instructions by:
providing the security token to an emergency alert application executing on the mobile device;
authenticating, by the emergency alert application and based on the security token, the modified message; and
displaying, by the emergency alert application, the at least one notification and the message.

18. The non-transitory machine-readable medium of claim 16, wherein the instructions, when executed by one or more processors, further cause the one or more processors to perform steps comprising:
  causing the mobile device to execute the embedded instructions by:
    obtaining, by a third-party application executing on the mobile device, the modified message; and
    executing, by the third-party application, the embedded instructions to display the at least one notification.

19. The non-transitory machine-readable medium of claim 15, wherein the at least one notification is selected from the group consisting of an audible notification, a visual notification, and a haptic notification.

20. The non-transitory machine-readable medium of claim 15, wherein the instructions, when executed by one or more processors, further cause the one or more processors to perform steps comprising:
  obtaining at least one user characteristic;
  determining, based on the at least one user characteristic, at least one related user;
  determining, based on the at least one related user, at least one related mobile device; and
  transmitting the modified message to the at least one related mobile device.

\* \* \* \* \*